No. 694,522.  
C. S. BIRD.  
LINING MATERIAL.  
(Application filed Feb. 18, 1901.)  
Patented Mar. 4, 1902.
(No Model.)
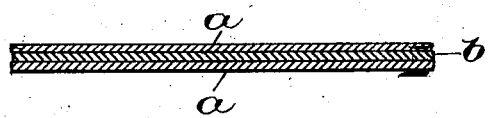
Witnesses:  
Jas. J. Maloney.  
Nancy P. Ford.
Inventor.  
Charles S. Bird,  
by J. P. and J. J. Livermore  
Att'ys.

UNITED STATES PATENT OFFICE.

CHARLES S. BIRD, OF WALPOLE, MASSACHUSETTS.

LINING MATERIAL.

SPECIFICATION forming part of Letters Patent No. 694,522, dated March 4, 1902.

Application filed February 18, 1901. Serial No. 47,787. (No model.)

*To all whom it may concern:*

Be it known that I, CHARLES S. BIRD, of Walpole, county of Norfolk, and State of Massachusetts, have invented an Improvement in Lining Material, of which the following description, in connection with the accompanying drawings, is a specification, like letters on the drawings representing like parts.

The present invention relates to lining material such as is commonly used for insulating refrigerators and the like, in which the insulation proper consists of a dead-air space between two walls, the lining being used for the purpose of excluding air and moisture from said dead-air spaces as far as possible. The material embodying the invention, however, may be used for other purposes.

The invention is embodied in the material for lining or other purposes of novel construction, the purpose being to make an inodorous material practically impervious to moisture and air and at the same time durable, so that it will not readily deteriorate through decay, as is the case with ordinary paraffin and rosin sized papers which have sometimes been used for purposes analogous to those for which the material of the invention is intended. The material embodying the invention comprises two unsized layers of paper impregnated or saturated with a moisture-repelling material—such as paraffin-wax, for instance—between which is a continuous layer of waterproof substance, the layers being intimately and firmly united. The said waterproof substance should be adhesive, and a mixture asphaltic in nature may be used to advantage, as it can be applied in a molten condition, and will to a certain extent permeate the paper and firmly adhere thereto when it has solidified. In the manufacture of the material the waterproof substance is introduced between the sheets of paper, so that it may readily enter the pores of the paper, and when solidified stick firmly the two layers. It is essential that the outer layers of paper should be made moisture and air proof by being saturated or impregnated with a moisture-repelling mixture like paraffin-wax or a similar substance. So-called "rosin-sized" or dry outer layers of paper would not answer.

The drawing is an exaggerated section of a sheet of lining embodying the invention.

The material embodying the invention comprises the two outer layers $a$ of unsized paper and an intermediate continuous layer $b$ of asphalt or other suitable waterproof material. The surface layers $a$ are thoroughly saturated or impregnated with moisture-repelling material, such as paraffin-wax, which prevents the paper part from deteriorating rapidly, while the intermediate layer of waterproof material, like asphalt, renders the finished material practically water and air proof.

I claim—

1. As an article of manufacture, lining material which consists of outer layers of unsized paper; an intermediate layer of insoluble waterproofing material intimately uniting the inner surfaces of said outer layers and partially impregnating the pores thereof; and moisture-repelling material saturating the outer surfaces of the layers.

2. As an article of manufacture, lining material which consists of outer layers of unsized paper; an intermediate layer of asphalt intimately uniting the inner surfaces of said outer layers and partially impregnating the pores thereof; and paraffin saturating said outer layers.

In testimony whereof I have signed my name to this specification in the presence of two subscribing witnesses.

CHARLES S. BIRD.

Witnesses:
   FLORENCE E. HOLMES,
   EDWIN S. MORSE.